United States Patent [19]

Lucas

[11] Patent Number: 4,483,468
[45] Date of Patent: Nov. 20, 1984

[54] UNIVERSAL SPARE TIRE MOUNT FOR VEHICLES

[76] Inventor: Gary B. Lucas, Rte. 4 Box 638, Chio, Calif. 95920

[21] Appl. No.: 65,044

[22] Filed: Aug. 9, 1979

[51] Int. Cl.³ ............................................. B62D 43/02
[52] U.S. Cl. ............................ 224/42.06; 224/42.08; 224/42.21
[58] Field of Search ............... 224/42.03 A, 42.06, 224/42.08, 42.21, 42.24; 414/463, 466

[56] References Cited

U.S. PATENT DOCUMENTS

| | | | |
|---|---|---|---|
| 1,877,887 | 9/1932 | Fulton | 224/42.21 X |
| 2,063,558 | 12/1936 | Franklin | 414/463 |
| 3,448,904 | 6/1969 | Sahr | 414/466 X |
| 3,492,020 | 1/1970 | Musgrave | 224/42.21 X |
| 3,610,658 | 1/1971 | Satori | 224/42.06 X |

Primary Examiner—Stephen Marcus
Attorney, Agent, or Firm—Leonard Bloom

[57] ABSTRACT

Disclosed herein is a tire mount for vehicles such as trucks including a frame member complimentally formed to nest withon a bumper and a swing arm member affixed thereto by one pivot point and constrained from relative motion by a releaseable locking pin. The pin and the pivot point reside within a singular slot disposed on the swing arm, so that the swing arm which carries the tire can be moved from a first position to a second position which allows access to a truck body for example.

6 Claims, 3 Drawing Figures

UNIVERSAL SPARE TIRE MOUNT FOR VEHICLES

BACKGROUND OF THE INVENTION

Since the inception of inflatable tires, carrying a spare has always been seen to be a necessary evil. Associated with this need has been the logistical problem of where to unobstrusively mount the spare tire so that vehicle space is not compromised, and that the spare tire will be disposed in such a fashion that it is easily accessible yet relatively out of the way.

Prior art devices illustrative of various techniques in solving this problem comprise the following four patents:

U.S. Pat. No. 3,43,736—Sellers
U.S. Pat. No. 3,428,230—Korf et al.
U.S. Pat. No. 3,387,754—Sinkey et al.
U.S. Pat. No. 3,610,658—Sartori.

Of these, all the references except Korf et al appear to rely upon a hinge member which allows the tire carried at the rear of the vehicle to rotate downwardly towards the ground, and in each of these three cases, the attaching structure about which the tire and its hinged point is to pivot do not provide a positive stop and locking mechanism so that the vehicle can be driven when the spare tire holder is hinged downwardly.

Clearly, and especially when such a device is installed on trucks having flatbeds, the size of the load carried within the truck bed may extend beyond the dimensions of the truck so that an overhang may be required. In these situations, it is apparent that tire kits as illustrated in the prior art cannot be utilized during this condition.

Further differences between the prior art and the instant application will become evident when considering the ensuing description.

SUMMARY OF THE INVENTION

By way of contrast, the following detailed specification contemplates as an objective providing a device for mounting a tire preferably to the bumper of a vehicle such as a truck which can be employed in an up or down position with the assurance that the tire thus mounted will be firmly affixed.

A further object contemplates providing a tire mounting device of the character described above in which the accessibility thereof is at an optimum, yet the tire does not take up any useable cargo space.

A further object contemplates providing a device of the character described above which is relatively simple to manufacture, reliable in use, and easy to install.

It is yet a further object of this invention to provide a mounting device of the character described above wherein the tire is easily accessible should its use be required.

These and other objects will be made manifest when considering the following detailed specification when taken in conjunction with the appended drawing figures.

BRIEF DESCRIPTION OF THE PREFERRED EMBODIMENT

Figures 1, 2, 3:
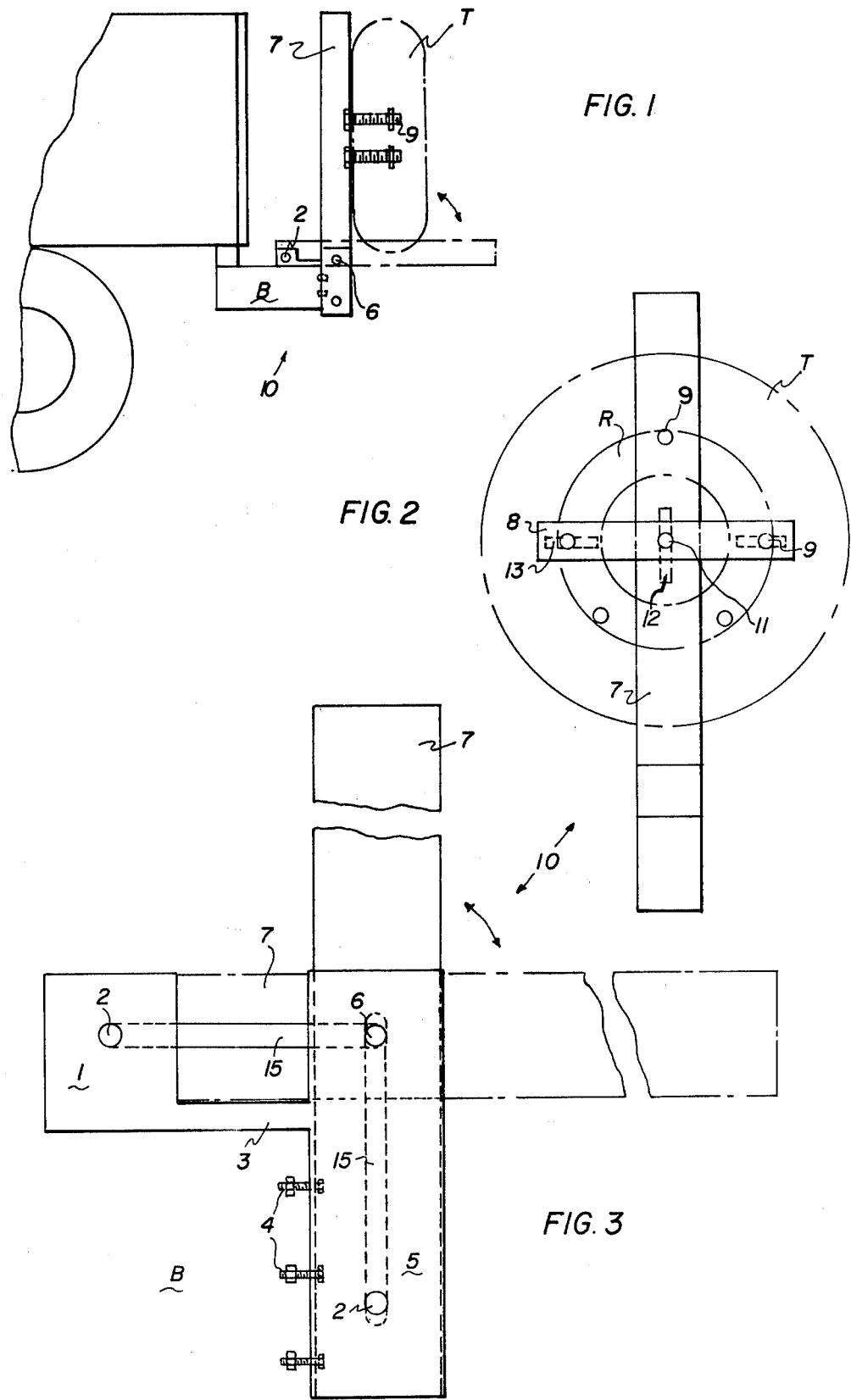
FIG. 1 is a side view of the apparatus according to the present invention having one form of tire retention.
FIG. 2 is a front view thereof.
FIG. 3 is a detailed side view of the pivoting area shown in FIG. 1.

Referring to the drawings now, wherein like reference numerals refer to like parts throughout the several figures, reference numeral 10 is directed to the tire mounting device according to the present invention.

As shown in the drawings, a frame member is provided which has a vertical leg 5 and a horizontal leg 3 overlying the bumper B and at the extremity of the horizontal leg remote from leg 5 is a shorter vertical leg 1 so that the general appearance of the frame member may conveniently be regarded as a backwards figure "4". Each vertical leg has a hole therewithin for purposes to be assigned later. FIG. 3 shows that the frame member is bolted to the bumper as through bolt members 4.

Attached to the frame member is a pivot 6 upon which a swing arm member 7 is slideably disposed through a lower portion which is provided with an elongate slot 15. When the tire is disposed as shown in FIG. 1, the elongate slot which is coaxial with the length of the swing arm is locked in place by means of the pivot 6 and a releaseable locking pin 2 extending through the hole in the vertical leg 5 in such a manner that motion of the swing arm relative to the vehicle is impossible.

To rotate the tire out of the way of the tailgate as suggested by FIG. 1, the lower locking pin 2 is removed from the frame member and the swing arm, the swing arm 7 is pulled upwardly in a substantially vertical plane, and thereafter rotated according to the drawings clockwise. Thereafter, should it be desired to lock the swing arm in a substantially horizontal position, the swing arm is pushed backwardly towards the truck so that slot 15 registers with the hole in the second shorter vertical leg 1 of the frame member whereupon the removeable pin 2 is inserted therethrough to firmly affix the swing arm in the horizontal position.

The swing arm 7 has a top extremity remote from the frame member provided with a cross piece 8 which allows a tire T to be mounted thereon. For this purpose, and in order to accomodate tires of various dimensions, the cross piece 8 is pivoted to the swing arm 7 by means of pivot 11 so that the pivot 11 carried on the cross arm 8 rides within a slot 12 disposed on said swing arm 7. The cross arm has slots 13 so that lug bolts 9 can be affixed through the slots to interconnect the cross arm to the wheel. As required, a further lug can engage the swing arm along its vertical extent as desired.

Having thus described the invention, it should be apparent that numerous structural modifications are contemplated as being a part of this invention as set forth herein above and as specified herein below by the claims.

What is claimed is:

1. A spare tire mount for vehicles comprising in combination:
    a frame member attached to a vehicle bumper having a pivot fixed at one point thereon, said frame member contoured to nest against a first vertical and a second horizontal face of the bumper,
    a swing arm member having an elongate slot along a lower extremity of its length, constrained for rotation by said pivot extending through said slot,
    and releaseable locking means extending through said frame member and said swing arm which in conjunction with said pivot, lock said swing arm in one of two fixed positions:

a first position in which said swing arm is substantially in a vertical plane and has said lower extremity flush with a vertical portion of said frame member, and a second position in which said swing arm is substantially in a horizontal plane and has said lower extremity flush with an horizontal portion of said frame member.

2. The device of claim 1 wherein said releaseable locking means comprises a removeable pin.

3. The device of claim 2 wherein said swing arm has a top portion for carrying the tire.

4. The device of claim 3 wherein said swing arm top portion connects with a cross arm for fastening the tire thereto.

5. The device of claim 4 wherein said cross arm is provided with slots at extremities thereof to accommodate tires of various dimensions.

6. The device of claim 5 wherein said cross arm is pivoted to said swing arm through a second slot on said swing arm.

* * * * *